US009446749B2

(12) United States Patent
Okano et al.

(10) Patent No.: US 9,446,749 B2
(45) Date of Patent: Sep. 20, 2016

(54) VEHICULAR BRAKE CONTROL APPARATUS

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Takahiro Okano, Chiryu (JP); Kiyohito Takeuchi, Nagoya (JP); Yusuke Kamiya, Okazaki (JP); Masaaki Komazawa, Miyoshi (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/430,862

(22) PCT Filed: Oct. 21, 2013

(86) PCT No.: PCT/JP2013/078476
§ 371 (c)(1),
(2) Date: Mar. 24, 2015

(87) PCT Pub. No.: WO2014/065237
PCT Pub. Date: May 1, 2014

(65) Prior Publication Data
US 2015/0266458 A1    Sep. 24, 2015

(30) Foreign Application Priority Data

Oct. 23, 2012 (JP) ................................ 2012-233452

(51) Int. Cl.
*B60T 13/122* (2006.01)
*B60T 11/16* (2006.01)
(Continued)

(52) U.S. Cl.
CPC .................. *B60T 11/16* (2013.01); *B60L 7/18* (2013.01); *B60T 1/10* (2013.01); *B60T 7/042* (2013.01);
(Continued)

(58) Field of Classification Search
CPC .... B60T 13/58; B60T 13/142; B60T 13/662; B60T 13/686; B60T 11/228; B60T 8/171; B60T 17/222; B60T 8/172; B60T 8/326
USPC ............... 303/3, 10, 14, 155, 114.3; 60/545; 188/352
See application file for complete search history.

(56) References Cited

U.S. PATENT DOCUMENTS

2009/0115242 A1* 5/2009 Ohtani .................... B60T 7/042
303/3
2010/0253137 A1* 10/2010 Matsuzaki ............ B60T 8/3265
303/155

(Continued)

FOREIGN PATENT DOCUMENTS

JP    2006-034034 A    2/2006
JP    2007-055588 A    3/2007

(Continued)

OTHER PUBLICATIONS

International Search Report (PCT/ISA/210) mailed on Jan. 21, 2014, by the Japanese Patent Office as the International Searching Authority for International Application No. PCT/JP2013/078476.

*Primary Examiner* — Christopher Schwartz
(74) *Attorney, Agent, or Firm* — Buchanan Ingersoll & Rooney PC

(57) ABSTRACT

The brake ECU applies the target braking force by controlling the hydraulic pressure braking force generating device and the regeneration braking force generating device and the brake ECU further controls the advance speed of the output piston so that a drawn-into of a brake operating member can be prevented upon supplying the wheel cylinders from the master cylinder with the brake fluid by advancing the output piston thereby to improve the brake operating feeling of the brake operating member by preventing the brake operating member from being drawn into.

6 Claims, 6 Drawing Sheets

(51) Int. Cl.
  *B60T 1/10* (2006.01)
  *B60T 13/14* (2006.01)
  *B60T 8/40* (2006.01)
  *B60L 7/18* (2006.01)
  *B60T 8/172* (2006.01)
  *B60T 7/04* (2006.01)
  *B60T 13/66* (2006.01)
  *B60T 13/68* (2006.01)

(52) U.S. Cl.
  CPC .............. *B60T 8/172* (2013.01); *B60T 8/4077* (2013.01); *B60T 13/146* (2013.01); *B60T 13/147* (2013.01); *B60T 13/662* (2013.01); *B60T 13/686* (2013.01); *B60T 2270/604* (2013.01)

(56) References Cited

U.S. PATENT DOCUMENTS

| | | |
|---|---|---|
| 2010/0270854 A1 | 10/2010 | Okano et al. |
| 2011/0285199 A1* | 11/2011 | Ishida ................... B60T 7/042 303/3 |
| 2012/0144822 A1 | 6/2012 | Isono |
| 2013/0127238 A1* | 5/2013 | Masuda ................ B60T 13/142 303/6.01 |
| 2013/0127240 A1* | 5/2013 | Noro ..................... B60T 13/58 303/14 |
| 2013/0127241 A1* | 5/2013 | Sakata ................... B60T 13/58 303/14 |
| 2013/0221736 A1* | 8/2013 | Kuki ..................... B60T 13/686 303/20 |
| 2014/0265546 A1* | 9/2014 | Shimizu ................ B60T 8/4077 303/20 |
| 2015/0015059 A1* | 1/2015 | Kamiya ................. B60T 7/042 303/6.01 |
| 2015/0015061 A1* | 1/2015 | Masuda ................. B60T 8/17 303/10 |
| 2015/0107241 A1* | 4/2015 | Okano ................... B60T 8/17 60/545 |
| 2015/0175145 A1* | 6/2015 | Nakata .................. B60T 11/16 188/352 |
| 2015/0217644 A1* | 8/2015 | Okano ................... B60T 1/10 701/70 |
| 2015/0266458 A1* | 9/2015 | Okano ................... B60T 1/10 303/3 |
| 2015/0291136 A1* | 10/2015 | Ninoyu ................. B60T 8/17 701/70 |
| 2015/0336551 A1* | 11/2015 | Okano ................. B60T 13/662 701/70 |
| 2015/0352960 A1* | 12/2015 | Okano ................... B60T 8/172 701/70 |
| 2015/0360654 A1* | 12/2015 | Masuda ................. B60T 7/042 60/545 |
| 2016/0001755 A1* | 1/2016 | Takeuchi .............. B60T 13/662 60/534 |

FOREIGN PATENT DOCUMENTS

| | | |
|---|---|---|
| JP | 2009-154600 A | 7/2009 |
| JP | 2011-051400 A | 3/2011 |
| JP | 2012-016984 A | 1/2012 |

* cited by examiner

Cylinder opening side ←——————→ Cylinder bottom surface side

VEHICULAR BRAKE CONTROL APPARATUS

TECHNICAL FIELD

This invention relates to a vehicular brake control apparatus which controls the hydraulic pressure braking force generating device and the regeneration braking force generating device thereby to apply a target braking force to the vehicle wheels.

BACKGROUND ART

Conventionally, a vehicular brake device has been known, which includes a hydraulic pressure braking force generating device which generates the hydraulic pressure braking force at the vehicle wheel corresponding to the wheel cylinder by supplying thereto with the brake fluid from the master cylinder and a regeneration braking force generating device which generates a regeneration braking force at the vehicle wheel. The master cylinder of the hydraulic pressure braking force generating device is formed by an input piston which slidably moves within the master cylinder and an output piston arranged at a front side of the input piston and slidably movable within the master cylinder. The input piston is cooperatively driven by a brake operating member and the output piston is driven independently of the operation of the brake operating member, wherein the brake fluid is supplied to the wheel cylinder from the master cylinder by an advance movement of the output piston. The master cylinder is provided with a rear chamber defined by an inner periphery portion of the master cylinder, a front end portion of the input piston and a rear end portion of the output piston and a front chamber defined by the inner periphery of the master cylinder and a front end portion of the output piston. The volume of the front chamber is variable by the advance movement of the output piston. A brake fluid pathway which connects the front and the rear chambers is formed in the master cylinder so that the brake fluid in the front chamber flows into the rear chamber by the advance movement of the output piston (See Patent Literature 1).

Further, a vehicular brake control apparatus is known (See Patent Literature 2) which controls a wheel cylinder hydraulic pressure to increase in advance up to a brake preparation hydraulic pressure level before a shifting at a low vehicle speed from the regeneration braking to a hydraulic pressure braking and at the same time controls the regeneration amount to be limited by a motor if the vehicle becomes in a braking operation state when the battery charging level is equal to or more than a second value which value is lower than a first value, where the generation of the battery is stopped.

CITATION LIST

Patent Literature

Patent Literature 1: JP2012-16984 A
Patent Literature 2: JP2006-34034 A

SUMMARY OF INVENTION

Technical Problem(s)

However, in the vehicular brake device described in the Patent Literature 1, if the wheel cylinder hydraulic pressure is increased regardless of the operation of the brake operating member as disclosed in the vehicular brake control apparatus according to the Patent Literature 2, a brake operating feeling caused by an operation of the brake operating member may be worsened.

Accordingly, this invention was made in consideration with the above-mentioned situation and the objective of the invention is to provide a vehicular brake control apparatus which can improve the operation feeling of a brake operation member as appeared in the conventional brake device.

Solution to Problem(s)

The vehicular brake control apparatus according to the invention associated with a first aspect is characterized in that the vehicular brake control apparatus is applied to a vehicular brake device which includes a hydraulic pressure braking force generating device which generates a hydraulic pressure braking force at a vehicle wheel corresponding to a wheel cylinder to which a brake fluid is supplied from a master cylinder and a regeneration braking force generating device which generates a regeneration braking force at the vehicle wheel, wherein the master cylinder includes an input piston which slidably moves within the master cylinder and an output piston arranged at a front of the input piston and slidably movable within the master cylinder, the input piston is moved in association with an operation of a brake operating member, whereas the output piston is driven independently of the operation of the brake operating member, wherein the brake fluid is supplied to the wheel cylinder from the master cylinder by an advance movement of the output piston, the master cylinder is provided with a rear chamber defined by an inner peripheral portion of the master cylinder, a front end of the input piston and a rear end of the output piston, a front chamber defined by the inner peripheral portion of the master cylinder and a front end of the output piston, the volume thereof being decreased by the advance movement of the output piston and a brake fluid pathway connecting the rear chamber and the front chamber thereby introducing the brake fluid in the front chamber into the rear chamber by the advance movement of the output piston and that the vehicular brake control apparatus applies a target braking force to the vehicle wheel by controlling the hydraulic pressure braking force generating device and the regeneration braking force generating device. The vehicular brake control apparatus includes a drive control means which controls an advance speed of the advance movement of the output piston to a set speed so that the brake operating member is prevented from "drawn-into" which occurs due to the advance movement of the output piston when the brake fluid is supplied to the wheel cylinder from the master cylinder by driving the output piston to advance.

The invention according to a second aspect is characterized in that in addition to the feature of the first aspect, the vehicular brake control apparatus includes a brake operation judging means for judging that a brake fluid amount in the wheel cylinder is the amount by which the hydraulic pressure braking force would not be generated or would be scarcely generated at the vehicle wheel corresponding to the wheel cylinder and that an increase of the hydraulic pressure braking force to be generated at the vehicle wheel corresponding to the wheel cylinder is predicted, wherein the drive control means advances the output piston with the set speed preceding a predicted increase of the hydraulic pressure braking force, when the brake operation judging means judged that the brake fluid amount in the wheel cylinder is the amount by which the hydraulic pressure braking force would not be generated or would be scarcely generated at the vehicle wheel corresponding to the wheel cylinder and that an increase of the hydraulic pressure braking force to be generated at the vehicle wheel corresponding to the wheel cylinder is predicted.

The invention according to a third aspect is characterized in that in addition to the feature of the above second aspect, the vehicular brake control apparatus includes an advance speed setting means for setting the set speed corresponding to a time period from a timing of a judgment to a timing of a predicted increase of the hydraulic pressure braking force, wherein when the brake operation judging means judges that the brake fluid amount in the wheel cylinder is the amount by which the hydraulic pressure braking force would not be generated or would be scarcely generated at the vehicle wheel corresponding to the wheel cylinder and that the increase of the hydraulic pressure braking force to be generated at the vehicle wheel corresponding to the wheel cylinder is predicted, the drive control means advances the output piston with the set speed set by the advance speed setting means.

The invention according to a fourth aspect is characterized in that in addition to the feature of the second or the third aspect, when the vehicle speed drops to a predetermined shifting start speed under the regeneration braking force generating device being generating the regeneration braking force, the regeneration braking force is shifted to the hydraulic pressure braking force responding to the drop of the vehicle speed, wherein the braking operation judging means judges that the brake fluid amount in the wheel cylinder is the amount by which the hydraulic pressure braking force would not be generated or would be scarcely generated at the corresponding wheel and that the increase of the hydraulic pressure braking force to be generated at the wheel corresponding to the wheel cylinder is predicted when the vehicle speed drops to a drive start speed which is higher than the shifting start speed.

The invention according to a fifth aspect is characterized in that in addition to the feature of the fourth aspect, the vehicular brake control apparatus further includes a drive start speed setting means for setting the drive start speed based on the set speed, a vehicle deceleration and the shifting start speed wherein the brake operation judging means judges that the brake fluid amount in the wheel cylinder is the amount by which the hydraulic pressure braking force would not be generated or would be scarcely generated at the corresponding wheel and that the increase of the hydraulic pressure braking force to be generated at the wheel corresponding to the wheel cylinder is predicted, when the vehicle speed drops to the drive start speed which is set by the drive start speed setting means.

The invention according to a sixth aspect is characterized in that in addition to any feature of the first through the fifth aspects, the vehicular brake control apparatus further includes a holding state judging means for judging whether the brake operating member is held to be in a holding state that an operating amount of the brake operating member is kept to be a constant amount, wherein the drive control means executes an advance speed control of the output piston when the brake operating member is judged to be in the holding state.

According to the brake control device associated with the invention of the first aspect, under the input piston being stopped, the hydraulic pressure braking force can be automatically generated by advancing the input piston regardless of the operation of the brake operating member and the hydraulic pressure braking force which is greater than the operating amount of the brake operating member can be generated by advancing the input piston with a speed faster than the input piston. As explained, when the output piston advances relative to the input piston, the volume of the front chamber is decreased to alternatively increase the volume of the rear chamber thereby allowing the brake fluid in the front chamber flowing into the rear chamber through the brake fluid pathway. It is noted here that as the speed of the output piston relative to the input piston becomes high, the flow resistance of the brake fluid pathway relative to the flow of the brake fluid into the rear chamber from the front chamber becomes large. This will generate a drawn-into phenomenon that the input piston, and eventually, the brake operating member is drawn into forwardly. Accordingly, according to the feature of the vehicular brake control apparatus of claim 1, the advance speed of the output piston is controlled to be a predetermined speed so that the brake operating member is prevented from being drawn into, which occurs due to the advance movement of the output piston when the brake fluid is supplied to the wheel cylinder from the master cylinder by driving the output piston to advance. Thus "drawn into" phenomenon of the brake operating member can be prevented thereby to improve the brake operation feeling by the operation of the brake operating member.

According to the vehicular brake control apparatus associated with the invention of the second aspect, the drive control means advances the output piston with the set speed preceding the predicted increase of the hydraulic pressure braking force, when the brake operation judging means judged that the brake fluid amount in the wheel cylinder is the amount by which the hydraulic pressure braking force would not be generated or would be scarcely generated at the vehicle wheel corresponding to the wheel cylinder and the brake fluid amount in the wheel cylinder is increased from the brake fluid amount by which the hydraulic pressure braking force would not be generated or would be scarcely generated at the vehicle wheel corresponding to the wheel cylinder. Thus, by preparing the predicted increase of the hydraulic pressure braking force, by preventing the drawn-into of the brake operating member, the brake fluid is supplied to the wheel cylinder from the master cylinder to thereby improving brake operation feeling by the brake operating member and at the same time improving the responsibility of the hydraulic pressure braking force. In other words, the deterioration of the responsibility of the hydraulic pressure braking force derived from the low advance speed of the output piston can be prevented. Further, since the brake fluid amount in the wheel cylinder at the start of the increase of the hydraulic pressure braking force has been increased, the responsibility of the hydraulic pressure braking force at the time of increase can be improved.

According to the vehicular brake control apparatus associated with the invention of the third aspect, when the brake operation judging means judges that the brake fluid amount in the wheel cylinder is the amount by which the hydraulic pressure braking force would not be generated or would be scarcely generated at the vehicle wheel corresponding to the wheel cylinder and that the increase of the hydraulic pressure braking force to be generated at the vehicle wheel corresponding to the wheel cylinder is predicted, the drive control means advances the output piston with the set speed set corresponding to a time period from a timing of a judgment to a timing of the predicted increase of the hydraulic pressure braking force. Thus, the brake fluid amount of the wheel cylinder at the time of predicted increase of the hydraulic pressure braking force and the set speed can be adjusted to improve both the operating feeling of the brake operating member and the responsibility of the hydraulic pressure braking force more appropriately.

According to the vehicular brake control apparatus associated with the invention of the fourth aspect, based on the vehicle speed, the brake fluid amount in the wheel cylinder is judged to be the amount by which the hydraulic pressure braking force is not generated or is scarcely generated at the vehicle wheel corresponding to the wheel cylinder and that the increase of the hydraulic pressure braking force to be generated at the vehicle wheel corresponding to the wheel cylinder is judged to be predicted. Since the vehicle speed can be calculated by using the sensor value of the vehicle wheel speed sensor or the like, the simplification of the device as a whole can be achieved.

As described in the invention of the fourth aspect, when the brake fluid amount in the wheel cylinder is judged to be the amount by which the hydraulic pressure braking force is not generated or is scarcely generated at the vehicle wheel corresponding to the wheel cylinder and that the increase of the hydraulic pressure braking force to be generated at the vehicle wheel corresponding to the wheel cylinder is judged to be predicted based on the drive start speed, the time period from the judgment until the start of the predicted increase of the hydraulic pressure braking force varies depending on the set speed and the deceleration of the vehicle. Accordingly, according to the vehicular brake control apparatus associated with the invention of the fifth aspect, the drive start speed is set based on the set speed, the deceleration of the vehicle and the shifting start speed. Therefore, the set speed is kept to be low and yet the brake fluid amount in the wheel cylinder is surely increased by the time the start of predicated increase of the hydraulic pressure braking force. Thus, keeping the operation feeling of the brake operating member to be comfortable, the responsibility of the hydraulic pressure braking force at the time of increasing.

The brake feeling is worsened when the brake operating member is drawn into under the brake operating amount is kept constant than under the state that the operating amount of the brake operating member is increased or decreased. Accordingly, according to the vehicular brake control apparatus associated with the invention of the sixth aspect, the output piston advances with a constant speed under the operating amount of the brake operating member being kept constant. By this structure, the brake operating feeling can be effectively improved.

BRIEF EXPLANATION OF ATTACHED DRAWINGS

EMBODIMENTS FOR IMPLEMENTING INVENTION

Figure 1:
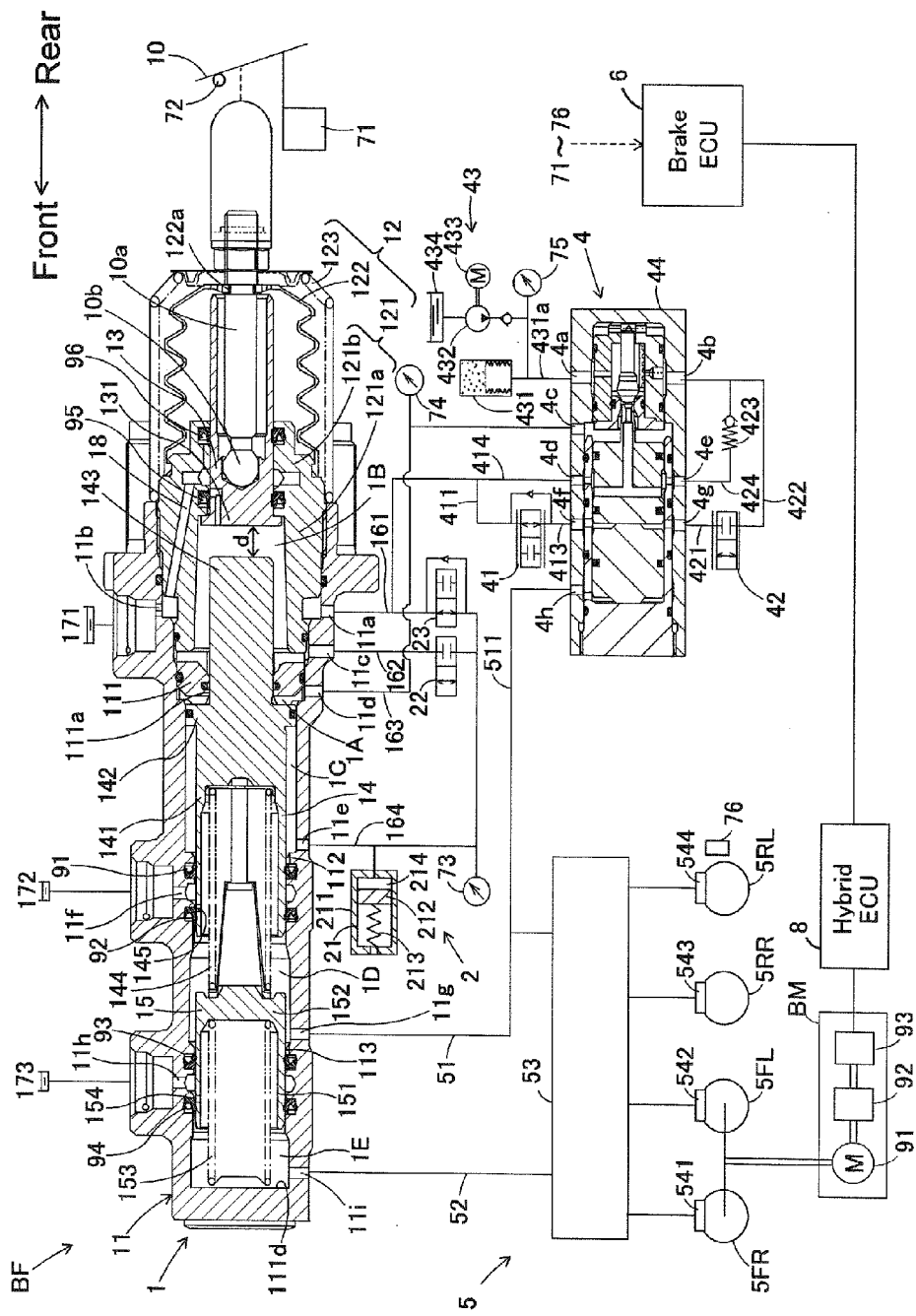
FIG. 1 is a view explaining the general structure of the vehicular brake control apparatus and the vehicular brake device controllable by the vehicular brake control apparatus according to an embodiment of the invention.

The vehicular brake control apparatus and a vehicular brake device which is controllable by the vehicular brake control apparatus according to the embodiment of the invention will be explained hereinafter with reference to the attached drawings. As shown in FIG. 1, the vehicular brake device is formed by a hydraulic pressure braking force generating device BF which generates the hydraulic pressure braking force at the vehicle wheels 5FR, 5FL, 5RR and 5R and a regeneration braking force generating device BM which generates the regeneration braking force at the drive wheels, such as for example, the front right and front left wheels 5FR and 5FL. The vehicular brake control apparatus is formed by a brake ECU 6 which controls the hydraulic pressure braking force generating device BF and a hybrid ECU 8 which controls the regeneration braking force generating device BM.

(Hydraulic Pressure Braking Force Generating Device BF)

The hydraulic pressure braking force generating device BF is formed by a master cylinder 1, a reaction force generating device 2, a separation lock valve 22, a reaction force valve 23, a servo hydraulic pressure generating device 4, a hydraulic pressure control portion 5 and various sensors 71 through 76.

(Master Cylinder 1)

The master cylinder 1 supplies the hydraulic pressure control portion 5 with the operation fluid in response to the operating amount of a brake pedal 10 (the brake operating means) and is formed mainly by a main cylinder 11, a cover cylinder 12, an input piston 13, a first master piston 14 (corresponding to the output piston) and a second master piston 15 (corresponding to the output piston).

The main cylinder 11 is formed in a substantially bottomed cylinder shape having an opening at rear end thereof and a bottom surface at a front end. The main cylinder 11 includes therein an inner wall portion 111, which extends inwardly with a shape of flange. An inner circumferential surface of the inner wall portion 111 is provided with a through hole 111a at a central portion thereof. The main cylinder 11 includes therein a small diameter portion 112 (rear) and a small diameter portion 113 (front), which inner diameter is somewhat smaller than the inner wall portion 111 towards the front side. In other words, the small diameter portions 112, 113 project from the inner circumferential surface of the main cylinder 11 having an inwardly annularly shape. The first master piston 14 is provided inside the main cylinder 11 and is slidably movable along the small diameter portion 112 in the axial direction. Similarly, the second master piston 15 is provided inside the master cylinder 11 and is slidably movable along the small diameter portion 113.

The cover cylinder 12 includes an approximately cylindrical portion 121, a bellow tubular boots 122 and a cupshaped compression spring 123. The cylindrical portion 121 is arranged at a rear end of the main cylinder 11 and is coaxially fitted into the opening of the main cylinder 11. An inner diameter of a front portion 121a of the cylindrical portion 121 is formed to be greater than an inner diameter of the through hole 111a. Further, the inner diameter of the rear portion 121b is formed to be greater than an inner diameter of the front portion 121a.

The boots 122 is of bellow tubular shaped and is used for dust prevention purpose and is extendible or compressible in front and rearward direction. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is configured to slidably move inside the cover cylinder 12 in response to an operation of a brake pedal 10 (brake operating member). The input piston 13 is formed in a substantially bottomed cylinder shape having a bottom surface at a front portion thereof and an opening at a rear portion thereof. A bottom wall 131 forming the bottom surface of the input piston 13 has a greater diameter than other parts of the input piston 13. The input piston 13 is arranged at the rear end portion 121b slidably and fluid-tightly movable in an axial direction and the bottom wall 131 is inserted into an inner peripheral side of the front portion 121a of the cylindrical portion 121.

The operating rod 10a operable in association with the brake pedal 10 is inserted into the input piston 13. A pivot 10b is provided at the tip end of the operating rod 10a so that the pivot 10b can push the input piston 13 toward front side. The rear end of the operating rod 10a projects towards the outside through the opening of the input piston 13 and the through hole 122a of the boots 122, and is connected to the brake pedal 10. The operating rod 10a moves in response to the operation of the brake pedal 10. More specifically, when the brake pedal 10 is depressed, the operating rod 10a advances in a forward direction while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil-shaped biasing member 144 is provided in the inner space of the pressurizing cylindrical portion 141 formed with the second master piston 15. The first master piston 14 is biased by the biasing member 144 in a rearward direction.

The flange portion 142 is formed to have a greater diameter than the pressurizing cylindrical portion 141 and is slidably in contact with the inner peripheral surface of the main cylinder 11. The projection portion 143 is formed to have a smaller diameter than the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a first pressure chamber 1D is defined by the inner peripheral surface of the main cylinder 11, front side of the pressurizing cylindrical portion 141 of the first master piston 14 and a rear side of the second master piston 15. A rear chamber which is located further rearward of the first pressure chamber 1D is defined by the inner peripheral surface (inner peripheral portion) of the main cylinder 11, the small diameter portion 112, a front surface of the inner wall portion 111 and the outer peripheral surface of the first master piston 14. The flange portion 142 of the first master piston 14 separates the rear chamber in front and rear portions and the front portion is defined to be the reaction force chamber 1C (corresponding to the front chamber) and the rear portion is defined to be the servo chamber 1A. A separation chamber 1B (corresponding to the rear chamber) is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit by a tubular pressurizing cylindrical portion 151 in a substantially bottomed cylinder shape having an opening at a front portion thereof and a bottom wall 152 which closes the rear end of the pressurizing cylindrical portion 151. The bottom wall 152 supports the biasing member 144 with the first master piston 14. A coil-shaped biasing member 153 is disposed in the inner space of the pressurizing cylindrical portion 151 with a closed inner bottom surface 111d of the main cylinder 11. The second master piston 15 is biased by the biasing member 153 in a rearward direction. A second pressure chamber 1E is defined by the inner peripheral surface of the main cylinder 11, the inner bottom surface 111d and the pressurizing cylindrical portion 151 of the second master piston 15.

Ports 11a to 11i, which connect the inside and the outside, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the separation chamber 1B via a passage 18 formed at the cylindrical portion 121 and the input piston 13. The fluid communication through the passage 18 is interrupted when the input piston 13 advances forward. In other words, when the input piston 13 advances forward, the separation chamber 1B and the reservoir 171 are disconnected from each other.

The port 11c is formed at a location forward of the port 11a and connects the separation chamber 1B with a conduit 162. The port 11d is formed at a location forward of the port 11c and connects the servo chamber 1A with a conduit 163. The port 11e is formed at a location forward of the port 11d and connects the reaction force chamber 1C with a conduit 164.

The port 11f is formed between the sealing members 91, 92 of the small diameter portion 112 and connects a reservoir 172 with the inside of the main cylinder 11. The port 11f is in communication with the first pressure chamber 1D via a passage 145 formed at the first master piston 14. The passage 145 is formed at a location where the port 11f and the first pressure chamber 1D are disconnected from each other when the first master piston 14 advances forward.

The port 11g is formed at a location forward of the port 11f and connects the first pressure chamber 1D with a conduit 51. The port 11h is formed between the sealing members 93, 94 of the small diameter portion 113 and connects a reservoir 173 with the inside of the main cylinder 11. The port 11h is in communication with the second pressure chamber 1E via a passage 154 formed at the second master piston 15. The passage 154 is formed at a location where the port 11h and the second pressure chamber 1E are disconnected from each other when the second master piston 15 advances forward. The port 11i is formed at a location forward of the port 11h and connects the second pressure chamber 1E with a conduit 52.

A sealing member such as an O-ring and the like (see black dot in FIG. 1) is appropriately provided within the master cylinder 1. The sealing members 91, 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members are provided between the input piston 13 and the cylindrical portion 121.

The stroke sensor 71 detects the operating amount (a stroke amount) of the operation of the brake pedal 10 and transmits the detected result to the brake ECU 6. A brake switch 72 is a switch which detects whether the brake pedal 10 is depressed or not using a binary signal and the detected result is sent to the brake ECU 6.

(Reaction Force Generating Device 2)

The reaction force generating device 2 is a device for generating a reaction force against the operation force of the brake pedal 10 and is formed by mainly a stroke simulator 21. The stroke simulator 21 generates a reaction force hydraulic pressure in the separation chamber 1B and the reaction force chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location backward of the piston 212, which is biased in the backward direction by a compression spring 213. The reaction force hydraulic pressure chamber 214 is connected to the reaction force chamber 1C via the conduit 164 and the port 11e, and is connected further to the separation lock valve 22 and the reaction force valve 23 via the conduit 164.

(Separation Lock Valve 22)

The separation lock valve 22 is an electromagnetic valve which is closed under non-energized state and opening and closing thereof is controlled by the brake ECU 6. The separation lock valve 22 is disposed between the conduit 164 and the conduit 162 for communication therebetween. The conduit 164 is connected to the reaction force chamber 1C via the port 11e and the conduit 162 is connected to the separation chamber 1B via the port 11c. The separation chamber 1B becomes in open state when the separation lock valve 22 opens and the chamber 1B becomes in closed state when the separation lock valve 22 closes. Accordingly, the conduits 164 and 162 are formed so that the separation chamber 1B and the reaction force chamber 1C are in communication.

The separation lock valve 22 is closed under non-energized state and under this state communication between the separation chamber 1B and the reaction force chamber 1C is interrupted. Due to the closure of the separation chamber 1B, the operation fluid is nowhere to go and the input piston 13 and the first master piston 14 are moved integrally keeping the constant distance "d" therebetween. The separation lock valve 22 is open under the energized state and under such state, the communication between the separation chamber 1B and the reaction force chamber 1C is established. Thus, the volume change in the separation chamber 1B and the reaction force chamber 1C due to the advancement and retreatment of the first master piston 14 can be absorbed by the transferring movement of the operation fluid.

The pressure sensor 73 detects the reaction force hydraulic pressure of the reaction force chamber 1C and is connected to the conduit 164. The pressure sensor 73 detects the pressures of the reaction force chamber 1C while the separation lock valve 22 is in a closed state. On the other hand, while the separation lock valve 22 is in an open state, the pressure sensor 73 also detects the pressure in the hydraulically connected separation chamber 1B. The pressure sensor 73 sends the detected signal to the brake ECU 6.

(Reaction Force Valve 23)

The reaction force valve 23 is a normally-open-type electromagnetic valve in which the valve is open under a non-energized state and is configured so that opening and closing thereof is controlled by the brake ECU 6. The reaction force valve 23 is disposed between the conduit 164 and the conduit 161 for establishing communication therebetween. The conduit 164 is in communication with the reaction force chamber 1C via the port 11e and the conduit 161 is in communication with the reservoir 171 via the port 11a. Accordingly, the reaction force valve 23 establishes communication between the reaction force chamber 1C and the reservoir 171 under the non-energized state not to generate any reaction force hydraulic pressure but interrupts the communication therebetween to generate the reaction force hydraulic pressure under the energized state.

(Servo Hydraulic Pressure Generating Device 4)

The servo hydraulic pressure generating device 4 mainly includes a pressure decreasing valve 41, a pressure increasing valve 42, a high pressure supplying portion 43 and a regulator 44. The pressure decreasing valve 41 is a normally-open-type electromagnetic valve which opens when the valve is not energized and flow-rate therethrough is controlled by the brake ECU 6. One port of the pressure decreasing valve 41 is connected to the conduit 161 via a conduit 411, and the other port of the pressure decreasing valve 41 is connected to a conduit 413. More specifically, the one outlet/inlet port of the pressure decreasing valve 41 is in communication with the reservoir 171 via the conduits 411, 161, and ports 11a, 11b. The pressure increasing valve 42 is a normally-closed-type electromagnetic valve and is closed when the valve is in non-energized state. The flow-rate of the pressure increasing valve 42 is controlled by the brake ECU 6. One outlet/inlet port of the pressure increasing valve 42 is connected to a conduit 421, and the other outlet/inlet port of the pressure increasing valve 42 is connected to a conduit 422.

The high pressure supplying portion 43 is a portion to supply a highly pressurized operation fluid to the regulator 44. The high pressure supplying portion 43 mainly includes an accumulator 431, a hydraulic pressure pump 432, a motor 433 and a reservoir 434.

The accumulator 431 is a tank in which the highly pressurized operation fluid is accumulated. The accumulator 431 is connected to the regulator 44 and the hydraulic pressure pump 432 via a conduit 431a. The hydraulic pressure pump 432 is driven by the motor 433 and supplies the accumulator 431 with the operation fluid accumulated in the reservoir 434. The pressure sensor 75 provided in the conduit 431a detects the accumulator hydraulic pressure in the accumulator 431 and a detected signal is sent to the brake ECU 6. The accumulator hydraulic pressure correlates with the accumulated operation fluid amount in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the operation fluid to the accumulator 431 in order to recover a pressure energy to the value equal to or more than the predetermined value.

Figure 2:
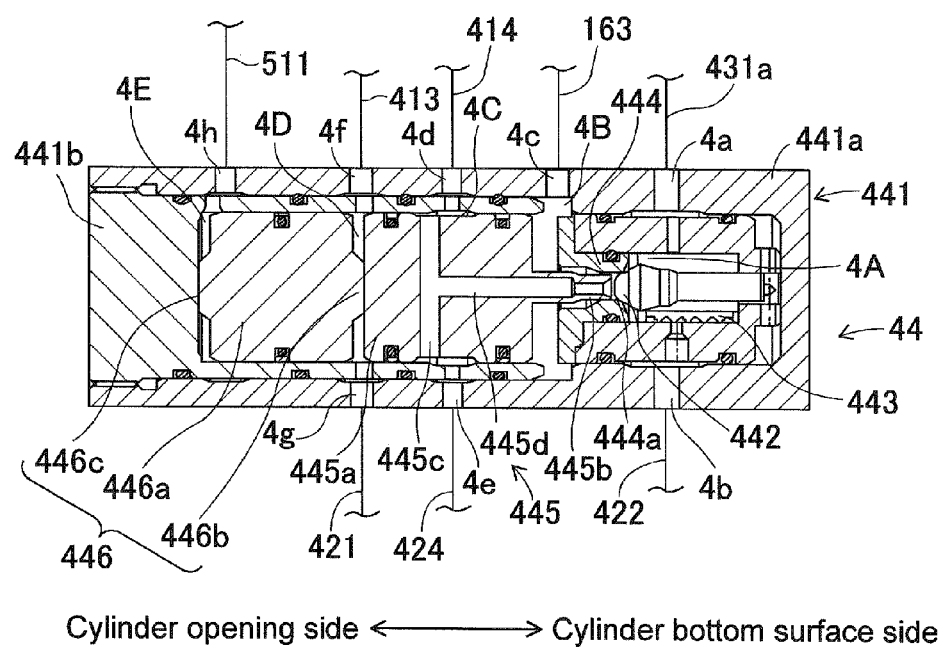
FIG. 2 is a view illustrating the detail structure of the servo pressure generating device according to the vehicular brake device shown in FIG. 1.

FIG. 2 is a partial cross sectional view illustrating a configuration of an inside of the regulator structuring a servo hydraulic pressure generating device. As shown in FIG. 2, the regulator 44 includes a cylinder 441, a ball valve 442, a biasing portion 443, a valve seat portion 444, a control piston 445 and a sub-piston 446.

The cylinder 441 includes a cylinder case 441a formed in a substantially bottomed cylinder-shape having a bottom surface at one end thereof (at the right side in the Figure), and a cover member 441b closing an opening of the cylinder case 441a (at the left side thereof). The cover member (441b) is formed to be substantially U-shaped in cross-section in the Figure. According to this embodiment, the regulator 44 is explained here with the cover member 441b as a columnar shaped member, and a portion that closes the opening of the cylinder case 441a as the cover member 441b in this embodiment. The cylinder case 441a is provided with a plurality of ports 4a to 4h through which the inside and the outside of the cylinder case 441a are in communication.

The port 4a is connected to the conduit 431a. The port 4b is connected to the conduit 422. The port 4c is connected to the conduit 163. The port 4c is connected to a conduit 163. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side of the cylinder case 441a inside of the cylinder 441 (which will be hereinafter referred to also as a cylinder bottom surface side). The biasing portion 443 is a spring member biasing the ball valve 442 towards the opening side of the cylinder case 441a (which will be hereinafter referred to also as a cylinder opening side), and is provided at the bottom surface of the cylinder case 441a. The valve seat portion 444 is a wall member provided at the inner peripheral surface of the cylinder case 441a and separates the cylinder into the cylinder opening side and the cylinder bottom surface side. A through passage 444a through which the divided cylinder opening side and the cylinder bottom surface side are in communication is formed at a center of the valve seat portion 444. The valve seat portion 444 supports the ball valve 442 from the cylinder opening side by closing the through passage 444a by the biased ball valve 442.

A space defined by the ball valve 442, the biasing portion 443, the valve seat portion 444, and a portion of the inner circumferential surface of the cylinder case 441a is referred to as a first chamber 4A. The first chamber 4A is filled with the operation fluid. The first chamber 4A is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is provided inside the cylinder 441 in a coaxial and liquid-tight manner relative to the cylinder opening side of the valve seat portion 444, while allowing the main body portion 445a to be slidably movable in the axial direction. The main body portion 445a is biased towards the cylinder opening by means of a biasing member (not shown). A passage 445c is formed at a substantially intermediate portion of the main body portion 445a in a cylinder axis direction. The passage 445c extends in the radial direction (in an up-and-down direction in Figure) and both end portions thereof open at a circumferential surface of the main body portion 445a. A portion of an inner circumferential surface of the cylinder 441 corresponding to an opening position of the passage 445c is provided with the port 4d and is formed to be recessed, which recessed portion forms a third chamber 4C.

The projection portion 445b projects towards the cylinder base surface from a center portion of an end surface of the main body portion 445a. The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening by a predetermined distance. A passage 445d is formed at the projection portion 445b so that the passage 445d extends in the cylinder axis direction and opens at a center portion of an end surface of the projection portion 445b. The passage 445d extends up to the inside of the main body portion 445a and is connected to the passage 445c.

A space defined by the end surface of the cylinder bottom surface of the main body portion 445a, an outer surface of the projection portion 445b, the inner circumferential surface of the cylinder 441, the valve seat portion 444, and the ball valve 442 is referred to as a second chamber 4B. The second chamber 4B is in communication with the ports 4d and 4e via the passages 445c and 445d and the third chamber 4C.

The sub-piston 446 includes a sub main body portion 446a, a first projection portion 446b, and a second projection portion 446c. The sub main body portion 446a is formed in a substantially columnar shape. The sub main body portion 446a is provided within the cylinder 441 in the coaxial and liquid-tight manner relative to the cylinder opening side of the main body portion 445a while allowing the sub main body portion 446a to be slidably movable in the axial direction.

The first projection portion 446b is formed in a substantially columnar shape having a smaller diameter than the sub main body portion 446a and projects from a center portion of an end surface of the cylinder bottom surface side of the sub main body portion 446a. The first projection portion 446b contacts the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c contacts the cover member 441b.

A space defined by the end surface of the cylinder bottom surface side of the sub main body portion 446a, an outer surface of the first projection portion 446b, an end surface of the cylinder opening side of the control piston 445, and the inner circumferential surface of the cylinder 441 is referred to as a pressure control chamber 4D. The pressure control chamber 4D is in communication with the pressure decreasing valve 41 via the port 4f and the conduit 413, and with the pressure increasing valve 42 via the port 4g and the conduit 421.

A space defined by the end surface of cylinder opening side of the sub main body portion 446af, an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511, 51. Each of the chambers 4A through 4E is filled with the operation fluid. The pressure sensor 74 is a sensor that detects the servo hydraulic pressure (drive hydraulic pressure) to be supplied to the servo chamber 1A and is connected to the conduit 163 (See FIG. 1). The pressure sensor 74 sends the detected signal to the brake ECU 6.

(Hydraulic Control Portion 5)

The first pressure chamber 1D and the second pressure chamber 1E which generate the master cylinder pressure are in communication with the wheel cylinders 541 through 544 via the conduits 51, 52 and the ABS (Antilock Brake System) 53. The wheel cylinders 541 through 544 form the brake 5 of the wheels 5FR through 5RL. In detail, the port 11g of the first pressure chamber 1D and the port 11i of the second pressure chamber 1E are respectively connected to the known ABS 53 via the conduits 51 and 52, respectively. The ABS is connected to the wheel cylinders 541 through 544 which operate the brake device for braking operation for the wheels 5FR through 5RL.

(Regeneration Braking Force Generating Device BM)

The regeneration braking force generating device BM is formed by a motor, for example, an AC (alternate current) synchronizing type motor 91 which connects the both front wheels 5FR and 5FL with the vehicle axle and an inverter 92 which charges the AC electricity generated by the motor 91 by converting the AC into DC electricity and supplies the motor 91 with an AC current by converting DC current of the battery 93 into the AC current.

(Brake ECU 6)

The brake ECU 6 is an electronic control unit housing a microprocessor inside thereof and the microprocessor is provided with an I/O (Input/Output) interface, CPU, RAM, ROM and non-volatile memory, respectively connected with one another through a bus connection.

The brake ECU 6 is connected to the various sensors 71 through 76 to control each of the electro-magnetic valves 22, 23, 41, 42 and the motor 433. The operating amount (stroke amount) of the brake pedal 10 by the operator of the vehicle from the stroke sensor 71, a signal informing whether or not the operation of the brake pedal 10 by the operator is made from the brake switch 72, the reaction force hydraulic pressure in the reaction force chamber 1C or the pressure in the separation chamber 1B from the pressure sensor 73, the servo hydraulic pressure (drive hydraulic pressure) supplied to the servo chamber 1A from the pressure sensor 74, the accumulator hydraulic pressure of the accumulator 431 from the pressure sensor 75 and wheel speed of each wheel 5FR, 5FL, 5RR and 5RL from the vehicle wheel speed sensor 76 are respectively inputted to the brake ECU 6.

Further, the brake ECU 6 is mutually communicably connected to a hybrid ECU 8 and in cooperation with the hybrid ECU 8, executes a cooperative control (regeneration cooperative control) so that the required braking force becomes equal to the sum of the target regeneration braking force generated at the regeneration braking force generating device BM and the target hydraulic pressure braking force generated at the hydraulic pressure braking force generating device BF. The brake ECU 6 memorizes two control modes, "linear mode" and "regulator mode".

(Hybrid ECU 8)

The hybrid ECU 8 controls the charging state of the battery 93 and executes the regeneration braking control by cooperation with the brake ECU 6. In other words, the hybrid ECU 8 charges the electricity in the battery 93 obtained from the generation operation of the motor 91 which is driven by the rotation force of both front wheels 5FR and 5FL. Upon the electricity generation, the regeneration braking force is generated by the resistance force of the motor 91 and outputs the regeneration braking force to the brake ECU 6.

(Operation Mode of Brake ECU 6)

The brake ECU 6 has two modes, linear and regulator modes as the operation mode of the master cylinder device 100 which is the subject for control. The linear mode is a mode of a hydraulic pressure braking control selected when the vehicle is running under normal state. Under the linear mode, when the braking force corresponding to the operating amount of the brake pedal 10 cannot be sufficiently generated only by the regeneration brake device, the first and the second master pistons 14 and 15 are operated by the servo hydraulic pressure generating device 4 thereby to generate the hydraulic pressure braking force supplementing the insufficient amount of braking force. On the other hand, the "regulator mode" is a mode of the hydraulic pressure braking control selected when an abnormality has occurred. Under the regulator mode, the separation chamber 1B is closed and each of the pistons 13, 14 and 15 are driven by the operation force of the operator of the vehicle thereby to generate hydraulic pressure braking force. The two modes to which the invention is applied will be explained in more detail hereinafter.

In the "linear mode", the brake ECU 6 energizes the separation lock valve 22 to open and energizes the reaction force valve 23 to close. Due to the closure of the reaction force valve 23, the communication between the reaction force chamber 1C and the reservoir 171 is interrupted and due to the opening of the separation lock valve 22, the communication between the separation chamber 1B and the reaction force chamber 1C is established. When the brake pedal 10 is not depressed, the ball valve 442 of the servo hydraulic pressure generating device 4 keeps the through passage 444a of the valve seat to be closed. Further, the pressure decreasing valve 41 is in an open state and the pressure increasing valve 42 is in a closed state thereby interrupting the communication between the first chamber 4A and the second chamber 4B. The second chamber 4B is in communication with the servo chamber 4A via the conduit 163 to keep the hydraulic pressure in the two chambers to be mutually in an equal level. The second chamber 4B is in communication with the third chamber 4C via the passages 445c and 445d of the control piston 445, and further is in communication with the reservoir 171 via the conduits 414 and 161. One side of the pressure control chamber 4D is closed by the pressure increasing valve 42 and the other side is connected to the reservoir 171 through the pressure decreasing valve 41. The fourth chamber 4E is in communication with the first pressure chamber 1D via the conduits 511 and 51 and the hydraulic pressure in the two chambers 4E and 1D are kept to the same hydraulic pressure level. Thus, there is no servo hydraulic pressure generated in the servo chamber 1A and no master cylinder hydraulic pressure generated in the first pressure chamber 1D.

Under this state, when the brake pedal 10 is depressed, the input piston 13 advances to interrupt the communication with the passage 18. Thus, the communication between the reservoir 171 and the separation chamber 1B is interrupted. The stroke simulator 21 generates the reaction force pressure in the separation chamber 1B and the reaction force chamber 1C in response to the stroke amount. In other words, the stroke simulator 21 applies the brake pedal 10 which is connected to the input piston 13 with the reaction force pressure corresponding to the stroke amount of the input piston 13 (operating amount of the brake pedal 10).

It is noted here that the area of the surface of the flange portion 142, facing to the reaction force chamber 1C is set to be equal to the area of the tip end surface of the projection portion 143. Therefore, when the reaction force valve is in a closed state and the separation lock valve 22 is in an open state, the internal pressure of the separation chamber 1B and the internal pressure of the reaction force chamber 1C are equal. Accordingly, the force that the reaction force pressure of the separation chamber 1B is applied to the tip end surface of the projection portion 143 is equal to the force that the reaction force pressure of the reaction force chamber 1C is applied to the surface facing to the reaction force chamber 1C and even when the operator of the vehicle depresses the brake pedal 10 to raise the internal pressure of the separation chamber 1B and the reaction force chamber 1C, the first master piston 14 does not move. Further, since the area of the tip end surface of the projection portion 143 and the area of the surface of the flange portion 142 facing to the reaction force chamber 1C are set to be equal, even when the first master piston 14 is moved, the fluid amount flowing into the stoke simulator 21 is not changed, the reaction force pressure in the separation chamber 1B is not changed thereby keeping the reaction force transmitted to the brake pedal 10 to be unchanged.

On the other hand, the brake ECU 6 and the hybrid ECU 8 control the hydraulic pressure braking force generating device BF and the regeneration braking force generating device BM to apply the target braking force to each of the wheels 5FR, 5FL, 5RR and 5RL. According to the embodiment, the brake ECU 6 and the hybrid ECU 8 control to use the regeneration braking force generating device BM on a priority basis. In other words, the brake ECU 6 calculates the target value of the regeneration amount (target regeneration amount) and outputs the target regeneration amount to the hybrid ECU 8. The hybrid ECU 8 then calculates the regeneration amount which executes (execution regeneration amount) relative to the target regeneration amount and outputs the execution regeneration amount to the brake ECU 6. The brake ECU 6 then calculates the shortfall of the braking force by subtracting the regeneration braking force corresponding to the execution regeneration amount from the target braking force and controls the hydraulic pressure braking force generating device BF to generate the shortfall braking force.

In the servo pressure generating device 4, the accumulator 431 and the pressure control chamber 4D are in communication when the pressure increasing valve 42 opens. By the closure of the pressure decreasing valve 41, the communication between the pressure control chamber 4D and the reservoir 171 is interrupted. The hydraulic pressure in the pressure control chamber 4D can be increased by the high pressure operation fluid supplied from the accumulator 431. Due to the increase of the pressure in the pressure control chamber 4D, the control piston 445 slidably moves in the cylinder bottom surface side direction. Then the control piston 445 contacts the ball valve 442 at the tip end of the projection portion 445b of the control piston 445 to interrupt the passage 445d by the ball valve 442. Then the communication between the second chamber 4B and the reservoir 171 is interrupted.

Further slidable movement of the control piston 445 towards the cylinder bottom surface side pushes the ball valve 442 towards the cylinder bottom surface side by the projection portion 445b to separate the ball valve 442 from the valve seat portion 444. This will allow communication between the first chamber 4A and the second chamber 4B through the through passage 444a of the valve seat portion 444. A high pressure operation fluid is supplied to the first chamber 4A from the accumulator 431 and the hydraulic pressure in the second chamber 4B which is in communication with the first chamber 1A is also increased.

As the pressure in the second chamber 4B increases, the servo hydraulic pressure in the servo chamber 1A which is in communication with the second chamber 4B increases accordingly. Due to the increase of the servo hydraulic pressure, the first master piston 14 advances and the master cylinder hydraulic pressure in the first pressure chamber 1D increases by the advance movement of the first master piston 14. Then the second master piston 15 is also advances to increase the master cylinder hydraulic pressure in the second pressure chamber 1E. By this increase of the master cylinder hydraulic pressure, the high pressure operation fluid is supplied to the wheel cylinders 541 through 544 via the conduits 51 and 52 and the hydraulic pressure control portion 5 to apply hydraulic pressure braking force to the corresponding vehicle wheels 5FR through 5RL.

Further, the master cylinder hydraulic pressure in the first pressure chamber 1D is fed back to the fourth chamber 4E of the servo hydraulic pressure generating device 4 and accordingly, the pressure in the fourth chamber 4E increases to be balanced with the pressure in the pressure control chamber 4D thereby not to move the sub piston 446 by this pressure balance. Thus, the hydraulic pressure braking force can be generated which supplements the shortfall of the braking force based on the servo hydraulic pressure created by the high pressure operation fluid from the accumulator 431.

If the generation of the hydraulic pressure braking force is stopped, the pressure decreasing valve 41 is set to be in an open state and the pressure increasing valve 42 is set to be in a closed state. Then the pressure control chamber 4D is connected to the reservoir 171 thereby retreating the control piston 445. By this retreatment of the control piston 445, the servo hydraulic pressure generating device 4 returns to the state where the brake pedal 10 is not depressed.

It is noted here that according to the above explained hydraulic pressure braking force generating device BF, under the brake pedal 10 being kept in a depressed state, i.e., under the input piston 13 of the master cylinder 1 being kept in a stopped state, when the first and the second master pistons 144 and 15 are moved forward or when the first and the second master pistons 14 and 15 are moved forward faster than the speed of the input piston 13, the volume of the reaction force chamber 1C decreases while the volume of the separation chamber 1B increases. Then the brake fluid in the reaction force chamber 1C flows into the separation chamber 1B via the conduits 162 and 164. Faster the advance movement of the first and the second master pistons 14 and 15 relative to the input piston 13, greater the flow resistance of the conduits 162 and 163 relative to the flow of the brake fluid from the reaction force chamber 1C into the separation chamber 1B becomes which may cause a forward drawn-into operation of the brake pedal 10.

Figure 5A:
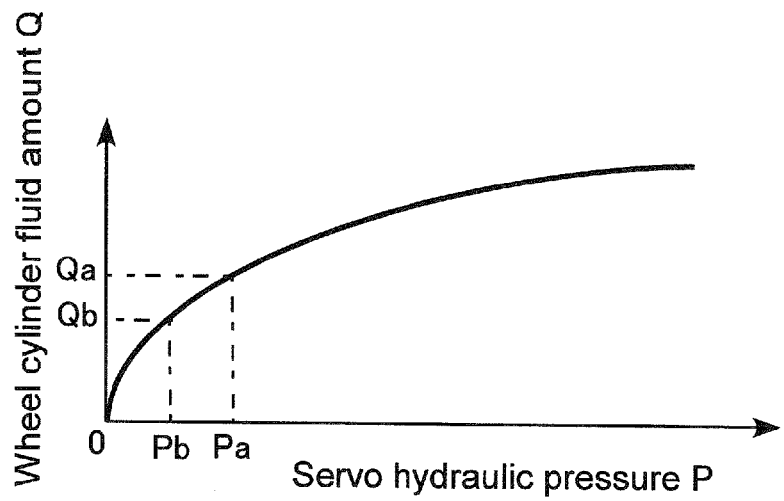
FIG. 5A is a view illustrating a relationship between the hydraulic pressure of the brake fluid in the servo chamber of the master cylinder and the brake fluid amount of the brake fluid in the wheel cylinder.
Figure 5B:
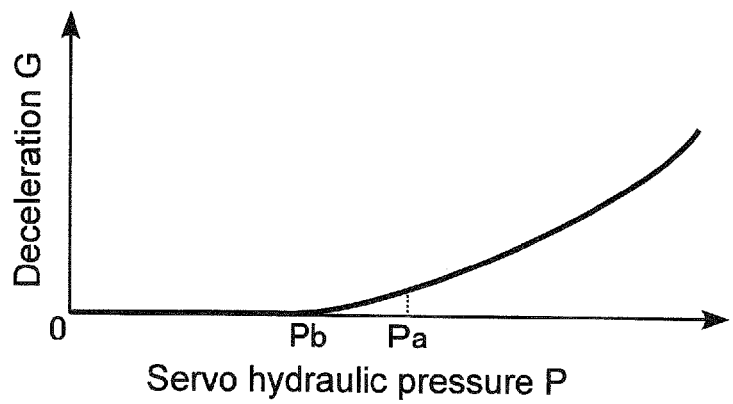
FIG. 5B is a view illustrating the hydraulic pressure of the brake fluid in the servo chamber of the master cylinder and the deceleration of the vehicle.

When the hydraulic pressure braking force to be generated at the wheels 5FR, 5FL, 5RR and 5RL is increased, for example, when the low speed shifting from the regeneration braking operation to the hydraulic pressure braking operation, since at the early stage of the low speed shifting, the brake fluid is largely consumed at the wheel cylinders 541 through 544, the increase of the brake fluid amount Q in the wheel cylinders 541 through 544 relative to the increase of the hydraulic pressure P of the brake fluid in the servo chamber 1A of the master cylinder 1 is gradually increasing, as shown in FIG. 5A. In other words, unless the hydraulic pressure P of the brake fluid in the servo chamber 1A of the master cylinder 1 is set to be in the range of Pb-Pa (Pb<Pa) and the brake fluid amount Q in the wheel cylinders 541 through 544 is set to be in the range of Qb-Qa (Qb<Qa), hydraulic pressure braking force at the wheels 5FR, 5FL, 5RR and 5RL is not generated or would be scarcely generated. As shown in FIG. 5B, the deceleration G of the vehicle cannot be raised. This may cause a delay in response of the hydraulic pressure braking operation.

Accordingly, in order to improve the brake pedal operation feeling by preventing such drawn-into phenomenon of the brake pedal 10, when the brake fluid is supplied to the wheel cylinders 541 through 544 from the master cylinder 1 by driving the first and the second master pistons to advance forward, the speed of the advancement of the first and the second master pistons 14 and 15 is controlled to be limited to a predetermined speed (hereinafter referred to as set speed) which can avoid the drawn-into of the brake pedal 10. Further, in order to improve the responsibility of the hydraulic pressure braking force, the brake ECU 6 advances the first and the second master pistons 14 and 15 with the set speed preceding the increase of the hydraulic pressure braking force. Thus, the brake fluid amount in the wheel cylinders 541 through 544 can be increased.

(Control Operation to Prevent the Drawn-Into Phenomenon of the Brake Pedal 10 and to Improve the Responsibility of the Hydraulic Pressure Braking Force by the Brake ECU 6)

Figure 3:
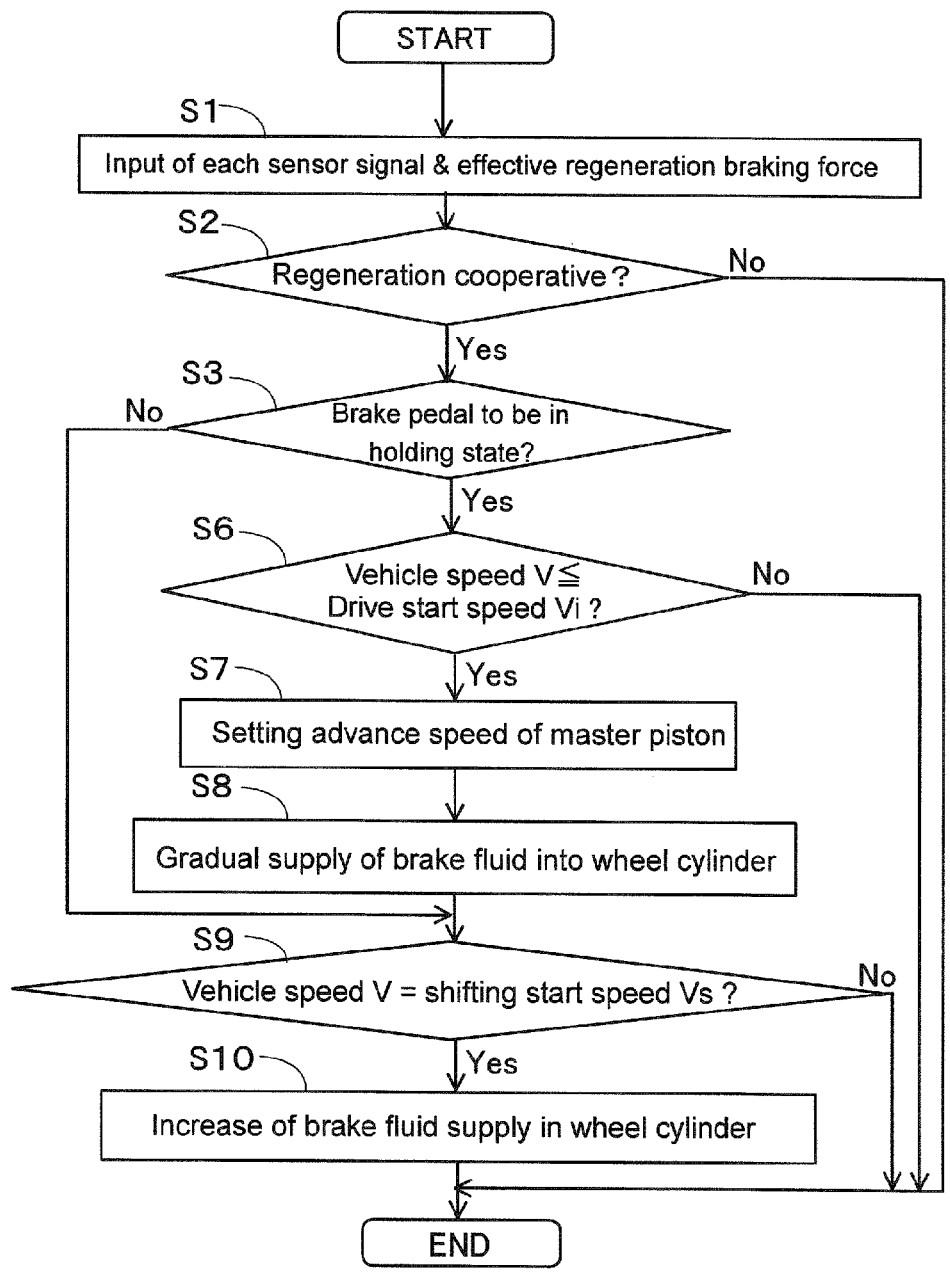
FIG. 3 is a flowchart explaining the operation of the vehicular brake control apparatus according to the embodiment.

Next, the control operation to prevent the drawn-into phenomenon of the brake pedal 10 and to improve the responsibility of the hydraulic pressure braking force by the brake ECU 6 will be explained with reference to the flowchart of FIG. 3. In FIG. 3, it is presumed that the drive start speed Vi with which the driving of the first and the second master pistons 14 and 15 to advance forward is set in advance to be a speed higher than a low speed start speed Vs of shifting from the regeneration braking force to the hydraulic pressure braking force. At the steps S1 and S2, the brake ECU 6 judges whether the regeneration cooperative control is under operation or not by inputting each of the sensor signals, for example, detection signals from the stroke sensor 71 and the vehicle wheel speed sensor 76 and the execution regeneration braking force from the hybrid ECU 8.

At the step S2, if the brake ECU 6 judged that the regeneration cooperative control is not executed, the process ends here but judged that the regeneration cooperative control is under execution, then at the step S3 the brake ECU 6 further judges whether the operating amount of the brake pedal 10 is maintained to a constant amount, i.e., whether the depression of the brake pedal 10 is held to be the depressed state or not (corresponding to the holding state judging means). The reason why this judgment in the step S3 has to be made is that if the brake pedal 10 is drawn into keeping the state that the brake pedal has been depressed to keep a constant operating amount, the brake operating feeling is worsened when the brake pedal 10 is drawn into, keeping the constant operating amount of the brake pedal 10 than in the case where the brake pedal 10 is drawn into when the operating amount of the brake pedal 10 is increased or decreased.

At the step S3, when the brake ECU 6 judges that the brake pedal 10 is depressed or released by the operator of the vehicle, the program advances to the step S9. On the other hand, if the brake ECU 6 judges that the depression of the brake pedal 10 by the operator is held to the depressed state, the program goes to the step S6.

At the step S6, the brake ECU 6 judges that the brake fluid amount in the wheel cylinders 541 through 544 is the amount by which the hydraulic pressure braking force would not be generated or would be scarcely generated at the corresponding wheels 5FR, 5FL, 5RR and 5RL and that the increase of the hydraulic pressure braking force to be generated at the wheels 5FR, 5FL, 5RR and 5RL corresponding to the wheel cylinders 541 through 544 is predicted. For example, the brake ECU 6 compares the vehicle speed V obtained by a detection signal from the vehicle wheel speed sensor 76 with the drive start speed Vi set in advance and if the brake ECU 6 judged that the vehicle speed V is higher than the drive start speed Vi, the process ends here. On the other hand, if the vehicle speed V is equal to or lower than the drive start speed Vi, the brake ECU 6 judges that the brake fluid amount in the wheel cylinders 541 through 544 is the amount by which the hydraulic pressure braking force would not be generated or would be scarcely generated at the corresponding wheels 5FR, 5FL, 5RR and 5RL and that the increase of the hydraulic pressure braking force to be generated at the wheels 5FR, 5FL, 5RR and 5RL corresponding to the wheel cylinders 541 through 544 has been predicted (corresponding to brake operation judging means). Then the program goes to the step S7.

At the step S7, the brake ECU 6 resets the advance speed of the first and the second master pistons 14 and 15 so that the fluid amount (for example, Qa) to be supplied to the wheel cylinders 541 through 544 can be supplied thereto by the time that the predicted hydraulic pressure braking force increase starts corresponding to the time from the judgment of the prediction of the increase of the hydraulic pressure braking force until the time that the predicted hydraulic pressure braking force increase starts (advance speed setting means). For example, the brake ECU 6 calculates the time from the judgment until the increase starts by dividing the value which is obtained by subtracting the shifting start speed Vs from the drive start speed Vi by the deceleration, then calculates the fluid amount to be supplied to the wheel cylinders 541 through 544 from the master cylinder 1 per unit time by dividing the brake fluid amount to be supplied to the wheel cylinders 541 through 544 by the time that the predicted hydraulic pressure braking force increase starts by the calculated time and sets the advance speed of the first and the second master pistons 14 and 15 corresponding to the calculated fluid amount to be the set speed. Then the brake ECU 6 advances the program to the step S8.

At the step S8, the brake ECU 6 advances the first and the second master pistons 14 and 15 with the set speed set at the step S7.

At the step S9, the brake ECU 6 judges whether the vehicle speed V obtained from the detection signal from the vehicle wheel speed sensor 76 drops to the shifting start speed Vs or not. If the brake ECU 6 judged that the vehicle speed V obtained from the detection signal from the vehicle wheel speed sensor 76 dropped to the shifting start speed Vs, the brake fluid amount to be supplied to the wheel cylinders 541 through 544 from the master cylinder 1 is increased at the step S10 and the process ends.

Figure 4:
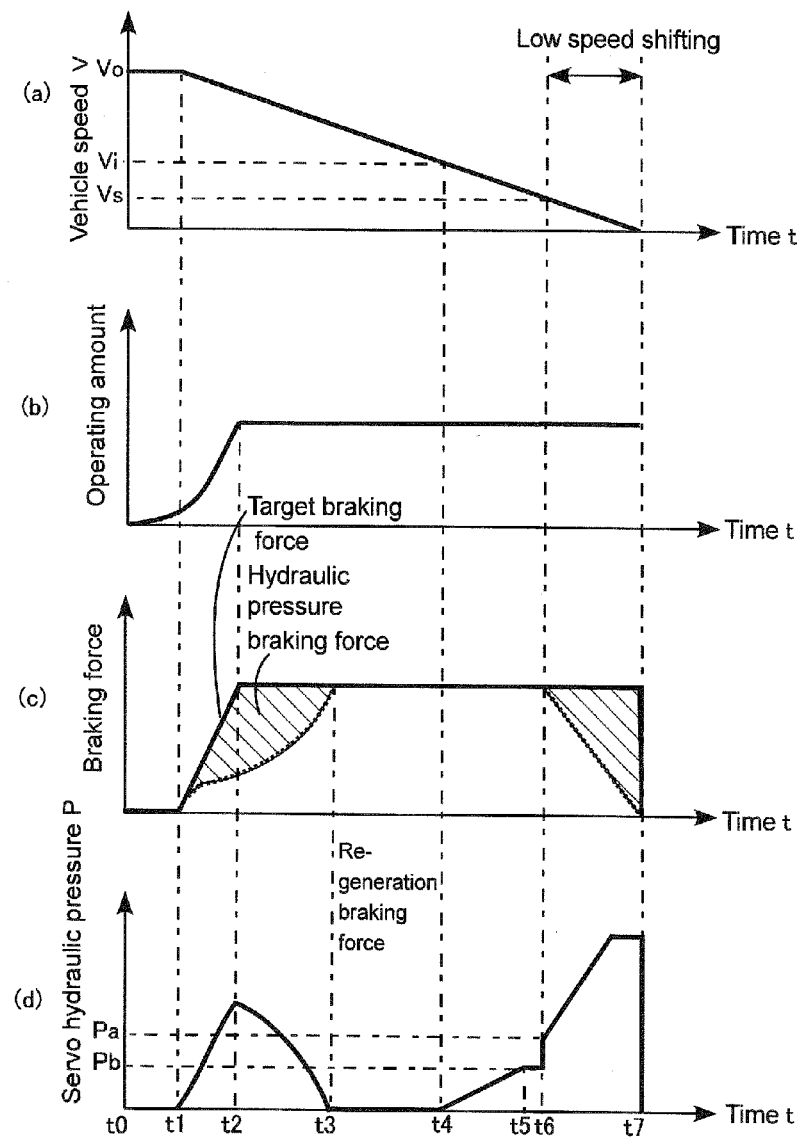
FIG. 4 is a time chart for explaining the operation of the vehicular brake control apparatus in which portion (a) indicates the vehicle speed changing with time, portion (b) indicates the operating amount of the brake pedal changing with time, the portion (c) indicates the braking force changing with time and the portion (d) indicates the servo hydraulic pressure changing with time.

Next, the operation of the brake ECU 6 will be explained with reference to the time chart in FIG. 4. In FIG. 4, it is presumed that the operating amount of the brake pedal 10 is increased to the time "t2" from the time "t0" and kept to a constant amount after the time "t2". At the time "t0", when the brake pedal 10 is depressed ((b) in FIG. 4), the vehicle speed V starts decreasing from the value V0 from the time "t1" and thereafter and the regeneration cooperative control starts ((b) of FIG. 4 from the time "t1~"). Then from the time "t1" to the time "t2", the hydraulic pressure braking force increases according to the increase of the brake operating amount of the brake pedal 10 and from the time "t2" to the time "t3", the hydraulic pressure braking force is decreased due to the increase of the regeneration braking force as the vehicle speed V decreases.

When the vehicle speed V becomes the drive start speed Vi at the time "t4", the brake fluid amount in the wheel cylinders 541 through 544 becomes the amount by which the hydraulic pressure braking force would not be generated or would be scarcely generated at the corresponding wheels 5FR, 5FL, 5RR and 5RL and that the increase of the hydraulic pressure braking force is predicted. Therefore, the first and the second master pistons 14 and 15 advance with the set speed which has been set corresponding to the time from the increase predicted time "t4" to the increase of the hydraulic pressure braking force start time "t6" and the brake fluid is gradually supplied to the wheel cylinders 541 through 544 from the master cylinder 1 with a level that the deceleration would not be generated by the hydraulic pressure braking force (Step S8 in FIG. 3). By this operation, the drawn-into operation of the brake pedal 10 is prevented thereby to improve the brake operation feeling thereof.

Then the hydraulic pressure P of the brake fluid in the servo chamber 1A of the master cylinder 1 is gradually increased from the increase of the hydraulic pressure braking force predicted time "t4" until the time "t5" which is somewhat earlier than the time "t6" when the increase of the hydraulic pressure braking force starts (so that the hydraulic pressure P in the servo chamber 1A can be surely increased to the value Pb at the time "t6" when the increase of the hydraulic pressure braking force starts) and from the time "t5" until the time "t6" when the increase of the hydraulic pressure braking force starts, the hydraulic pressure is held to be the value Pb (See (d) in FIG. 4). At the time "t6" when the increase of the hydraulic pressure braking force starts, the brake fluid amount Q in the wheel cylinders 541 through 544 has been surely increased to the value Qb to thereby improve the responsibility of the hydraulic pressure braking force at the time of increase thereof (See FIGS. 5A and 5B). It is noted here that the time that the hydraulic pressure reaches to the servo hydraulic pressure Pb can be set to be the time "t6" when the increase of the pressure braking force starts.

At the time "t6", when the vehicle speed V becomes the shifting start speed Vs, the hydraulic pressure P of the brake fluid in the servo chamber 1A is increased to the value Pa from Pb (See (d) in FIG. 4), the brake fluid amount to be supplied to the wheel cylinders 541 through 544 is added accordingly (Steps S9 and S110 in FIG. 2). Thus, the responsibility performance difference of the hydraulic pressure braking force relative to the regeneration braking force can be supplemented.

(Effects by the Control of Brake ECU 6)

As explained, the brake ECU 6 judges that the brake fluid amount in the wheel cylinders 541 through 544 is the amount by which the hydraulic pressure braking force would not be generated or would be scarcely generated at the corresponding wheels 5FR, 5FL, 5RR and 5RL and that the increase of the hydraulic pressure braking force to be generated at the wheels 5FR, 5FL, 5RR and 5RL corresponding to the wheel cylinders 541 through 544 is predicted. By this judgment, the set speed for advancing the first and the second master pistons 14 and 15 can be kept to be low and the brake fluid amount in the wheel cylinders 541 through 544 can be surely increased by the time that the predicted increase of the hydraulic pressure braking force starts. This can maintain the good operating feeling of the brake pedal 10 to more highly improve the responsibility of the hydraulic pressure braking force at the time of increase.

Further, the brake ECU 6 resets the advance speed of the first and the second master pistons 14 and 15 so that the fluid amount to be supplied to the wheel cylinders 541 through 544 can be supplied thereto by the time that the predicted hydraulic pressure braking force increase starts corresponding to the time from the judgment of the prediction of the increase of the hydraulic pressure braking force until the time that the predicted hydraulic pressure braking force increase starts. Thus, the brake fluid amount in the wheel cylinders 541 through 544 at the time of predicted increase of the hydraulic pressure braking force and the set speed of the first and the second master pistons 14 and 15 can be adjusted to improve both the operating feeling of the brake pedal 10 and the responsibility of the hydraulic pressure braking force more appropriately.

Further, the brake ECU 6 advances the first and the second master pistons 14 and 15 with the set speed. The brake fluid is gradually supplied to the wheel cylinders 541 through 544 from the master cylinder 1 with a level that the deceleration would not be generated by the hydraulic pressure braking force. Thus, for preparing for the increase of the hydraulic pressure braking force, the brake fluid is supplied to the wheel cylinders 541 through 544 from the master cylinder 1 preventing the drawn-into of the brake pedal 10 and the brake operating feeling by the brake pedal 10 and the responsibility of the hydraulic pressure braking force can be both further improved appropriately. In other words, since the first and the second master pistons 14 and 15 can be advanced with the set speed for a time period when the increase of the hydraulic pressure braking force is not yet required, a predetermined amount of the brake fluid is introduced into the wheel cylinders 541 through 544 and accordingly, brake fluid supply shortage in the wheel cylinders 541 through 544 does not occur which may otherwise be caused by the slow set speed of the first and the second master pistons 14 and 15. Thus, the responsibility of the hydraulic pressure braking force will not drop. Further, since the brake fluid amount has been already increased in the wheel cylinders 541 through 544 at the time the increase of the hydraulic pressure braking force starts, the responsibility of the hydraulic pressure braking force at the time of increase can be improved. Further, the brake fluid is gradually supplied with the level that no deceleration is generated and accordingly, decreasing of the regeneration braking force is not necessary to improve the fuel efficiency of the vehicle.

Further, the brake ECU 6 increases the brake fluid amount to be supplied to the wheel cylinders 541 through 544 from the master cylinder 1 when the vehicle speed V obtained by the detection signal from the vehicle wheel speed sensor 76 has decreased to the shifting start speed Vs. Thus, since the increase of the brake fluid amount to be supplied to the wheel cylinders 541 through 544 from the master cylinder 1 starts when the vehicle speed has dropped to the shifting start speed Vs, the performance responsibility difference of the hydraulic pressure braking force relative to the regeneration braking force can be supplemented. In this case, the performance responsibility difference of the hydraulic pressure braking force relative to the regeneration braking force can be highly precisely supplemented by changing the increase amount of the brake fluid in response to the brake fluid amount in the wheel cylinders 541 through 544 in advance or the target hydraulic pressure braking force.

According to the embodiment explained above, when the vehicle speed V drops to the drive start speed Vi, the brake ECU 6 judges that the brake fluid amount in the wheel cylinders 541 through 544 is equal to the amount by which the hydraulic pressure braking force would not be generated or would be scarcely generated at the corresponding wheels 5FR, 5FL, 5RR and 5RL and that the increase of the hydraulic pressure braking force has been predicted. Therefore, the first and the second master pistons 14 and 15 advance with the set speed. However, the following cases also result in the same effects when controlled according to the above embodiment, in the case that during the vehicle being running, the operating amount of the brake pedal 10 is smaller than the predetermined amount and that the shift lever of the automatic transmission has been changed from the drive range to the neutral range, or the case that the operating amount of the brake pedal 10 is smaller than the predetermined amount and that a failure of the regeneration braking force generating device BM is detected to occur in a short time.

Still further, the vehicular brake device B is explained in which a master cylinder 1 is provided which includes the first and the second master pistons 14 and 15 which advance forward by the generation of the servo pressure in the servo chamber 1A of the servo pressure generating device 4. However, another vehicular brake device can be applied to the invention, in which the master cylinder is provided with the first and the second master pistons which are advanced by a servo motor and a ball screw mechanism.

(Second Embodiment)

According to the second embodiment, when it is judged that the brake fluid amount in the wheel cylinders 541 through 544 is the amount by which the hydraulic pressure braking force would not be generated or would be scarcely generated at the corresponding wheels 5FR, 5FL, 5RR and 5RL and that the increase of the hydraulic pressure braking force to be generated at the wheels 5FR, 5FL, 5RR and 5RL corresponding to the wheel cylinders 541 through 544 is predicted, the drive start speed Vi corresponding to the set speed is set on a case-by case basis so that the brake fluid amount (for example, value Qa) to be supplied to the wheel cylinders 541 through 544 from the master cylinder 1 by the time when the predicted increase of the hydraulic pressure braking force starts.

Figure 6:
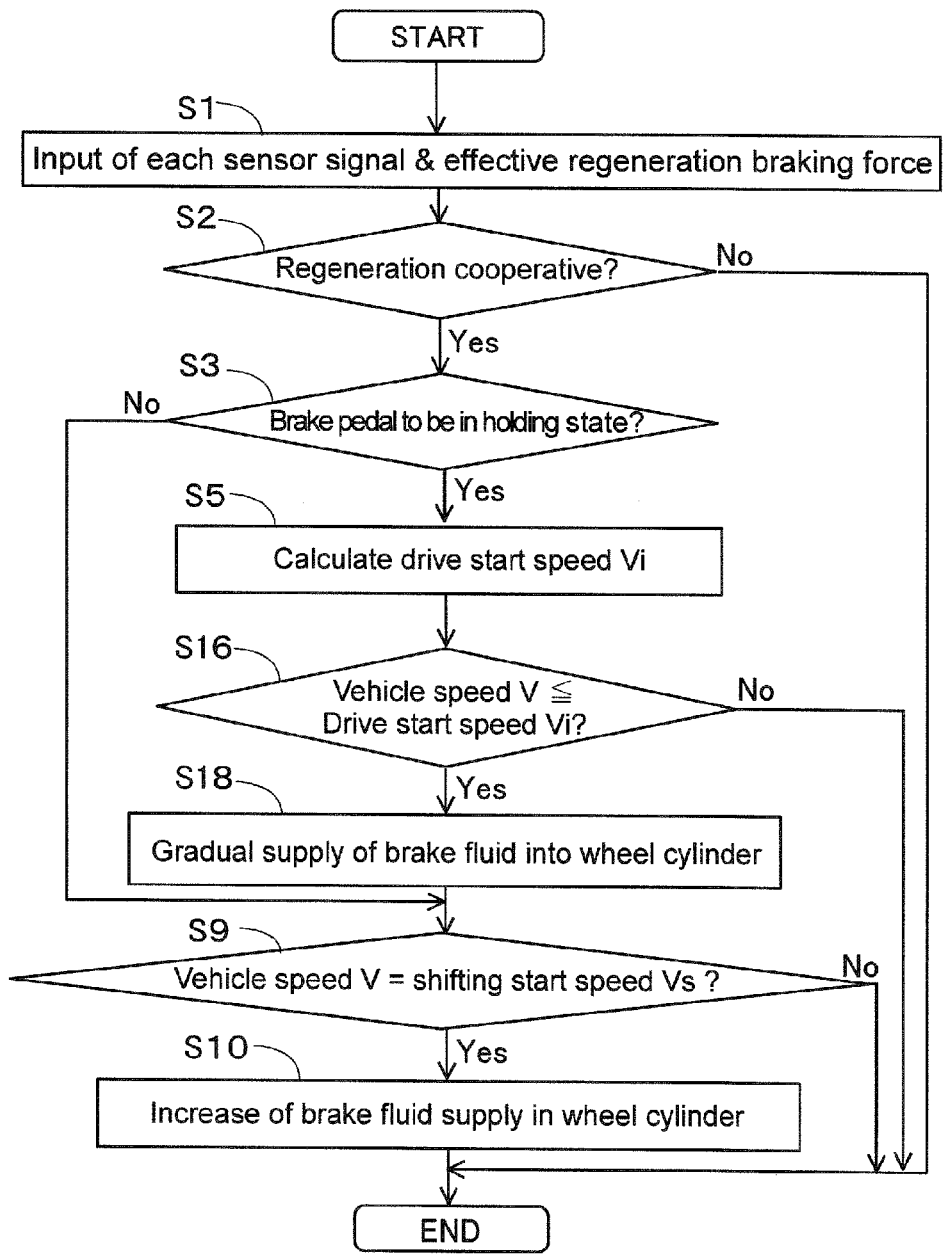
FIG. 6 is a flowchart explaining the operation of the vehicular brake control apparatus according to the second embodiment.

The structure of the second embodiment is substantially the same with that of the first embodiment except that the control illustrated in FIG. 3 according to the first embodiment corresponds to the control illustrated in FIG. 6 according to the second embodiment. Accordingly, the control in FIG. 6 will be explained and the explanation of the rest of the structure will be omitted. In FIG. 6, it is presumed that the advance speed of the first and the second pistons 14 and 15 is a constant value set in advance.

At the step S5, the brake ECU 6 sets the drive start speed Vi based on the deceleration and the shifting stat speed Vs. For example, the brake ECU 6 calculates the fluid amount of the brake fluid per unit time which is supplied to the wheel cylinders 541 through 544 from the master cylinder 1 by the advance movement of the first and the second pistons 14 and 15. Then the brake ECU 6 calculates the supply time for supplying the fluid amount Qa with the wheel cylinders 541 through 544 based on the brake fluid amount (for example, Qa) to be supplied to the wheel cylinders 541 through 544 preceding the shifting to the low speed and the supply amount per unit time. Then the brake ECU 6 calculates the vehicle speed ΔV which changes from the start of advancement of the first and the second pistons 14 and 15 until the supply of the fluid is completed based on the deceleration and the supply time, then adding the vehicle speed ΔV to shifting start speed Vs the drive start speed Vi is calculated thereby.

At the step S16, the brake ECU 6 compares the vehicle speed V with the drive start speed Vi which was calculated at the step S5 and when the vehicle speed V is higher than the drive start speed Vi, the process ends here. On the other hand when the vehicle speed V is equal to or smaller than the drive start speed Vi, the brake ECU 6 advances the program to the step S18. At the step S18, the brake ECU 6 advances the first and the second master pistons 14 and 15 with the advance speed set in advance.

(Other Embodiments)

According to the embodiments explained above, when the operating amount of the brake pedal 10 is judged to be constant at the step S3, the processes from the step S5 and thereafter are executed. However, when the advance speed of the first and the second master pistons 14 and 15 relative to the input piston 13 is judged to be higher, the processes of the step S5 and thereafter are executed. In this case the set speed may be set based on the advance speed of the input piston 13. The advance speed of the input piston 13 may be calculated for example based on the stroke amount.

According to the embodiments explained above, when it is judged that the brake fluid amount in the wheel cylinders 541 through 544 is the amount by which the hydraulic pressure braking force would not be generated or would be scarcely generated at the corresponding wheels 5FR, 5FL, 5RR and 5RL and that the increase of the hydraulic pressure braking force to be generated at the wheels 5FR, 5FL, 5RR and 5RL corresponding to the wheel cylinders 541 through 544 is predicted, the brake ECU 6 advances the first and the second master pistons 14 and 15 with the set speed preceding the increase of the hydraulic pressure braking force. However, the first and the second master pistons 14 and 15 may be advanced with the set speed, even under the above conditions are not established if the advance speed of the first and the second master pistons 14 and 15 relative to the input piston 13 is relatively high.

The invention claimed is:

1. A vehicular brake control apparatus applied to a vehicular brake device which includes
   a hydraulic pressure braking force generating device which generates a hydraulic pressure braking force at a vehicle wheel corresponding to a wheel cylinder to which a brake fluid is supplied from a master cylinder and
   a regeneration braking force generating device which generates a regeneration braking force at the vehicle wheel, wherein
   the master cylinder includes an input piston which slidably moves within the master cylinder and an output piston arranged at a front of the input piston and slidably movable within the master cylinder, the input piston is moved in association with an operation of a brake operating member, whereas the output piston is driven independently of the operation of the brake operating member, wherein the brake fluid is supplied to the wheel cylinder from the master cylinder by an advance movement of the output piston, the master cylinder is provided with a rear chamber defined by an inner peripheral portion of the master cylinder, a front end of the input piston and a rear end of the output piston, a front chamber defined by the inner peripheral portion of the master cylinder and a front end of the output piston, the volume thereof being decreased by the advance movement of the output piston and a brake fluid pathway connecting the rear chamber and the front chamber thereby introducing the brake fluid in the front chamber into the rear chamber by the advance movement of the output piston, wherein the vehicular brake control apparatus applies a target braking force to the vehicle wheel by controlling the hydraulic pressure braking force generating device and the regeneration braking force generating device and includes:
   a drive control means which controls an advancing speed of an advance direction movement of the output piston to a set speed so that the brake operating member is prevented from being drawn in the advance direction which would otherwise occur due to the advance direction movement of the output piston when the brake fluid is supplied to the wheel cylinder from the master cylinder by driving the output piston to advance.

2. The vehicular brake control apparatus according to claim 1, further comprising a braking operation judging means for judging that a brake fluid amount in the wheel cylinder is the amount by which the hydraulic pressure braking force would not be generated or would be scarcely generated at the corresponding wheel and that an increase of the hydraulic pressure braking force to be generated at the wheel corresponding to the wheel cylinder is predicted, wherein the drive control means advances the output piston with the set speed preceding a predicted increase of the hydraulic pressure braking force, when the braking operation judging means judged that the brake fluid amount in the wheel cylinder is the amount by which the hydraulic pressure braking force would not be generated or would be scarcely generated at the corresponding wheel and that an increase of the hydraulic pressure braking force to be generated at the wheel corresponding to the wheel cylinder is predicted.

3. The vehicular brake control apparatus according to claim 2 further comprising an advancing speed setting means for setting the set speed corresponding to a time period from a judgment to a timing of a predicted increase of the hydraulic pressure braking force, when the braking operation judging means judges that the brake fluid amount in the wheel cylinder is the amount by which the hydraulic pressure braking force would not be generated or would be scarcely generated at the corresponding wheel and that the increase of the hydraulic pressure braking force to be generated at the wheel corresponding to the wheel cylinder is predicted, wherein the drive control means advances the output piston with the set speed set by the advancing speed setting means.

4. The vehicular brake control apparatus according to claim 2, wherein when the vehicle speed drops to or less than a predetermined shifting start speed under the regeneration braking force generating device being generating the regeneration braking force, the regeneration braking force is shifted to the hydraulic pressure braking force responding to the drop of the vehicle speed, wherein the braking operation judging means judges that the brake fluid amount in the wheel cylinder is the amount by which the hydraulic pressure braking force would not be generated or would be scarcely generated at the corresponding wheel and that the increase of the hydraulic pressure braking force to be generated at the wheel corresponding to the wheel cylinder is predicted when the vehicle speed drops to a drive start speed which is higher than the shifting start speed.

5. The vehicular brake control apparatus according to claim 4, further comprising a drive start speed setting means for setting the drive start speed based on the set speed, a vehicle deceleration and the shifting start speed and wherein the braking operation judging means judges that the brake fluid amount in the wheel cylinder is the amount by which the hydraulic pressure braking force would not be generated or would be scarcely generated at the corresponding wheel and that the increase of the hydraulic pressure braking force to be generated at the wheel corresponding to the wheel cylinder is predicted when the vehicle speed drops to the drive start speed which is set by the drive start speed setting means.

6. The vehicular brake control apparatus according to claim 1, further comprising a holding state judging means for judging whether or not the brake operating member is held to be in a holding state that an operating amount of the brake operating member is kept to be a constant amount, wherein the drive control means executes an advancing speed control of the output piston when the brake operating member is judged to be in the holding state by the holding state judging means.

* * * * *